Jan. 27, 1970  A. FISCHER  3,491,665
CAMERA WITH BUILT-IN FLASH UNIT
Filed Nov. 15, 1966
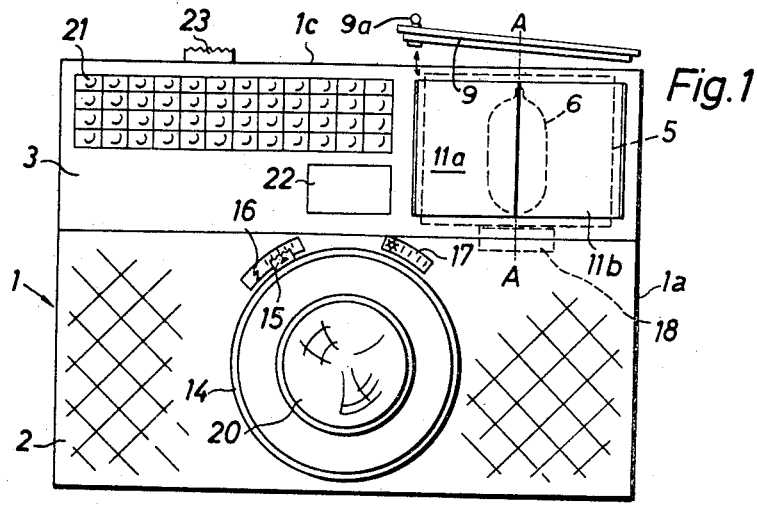
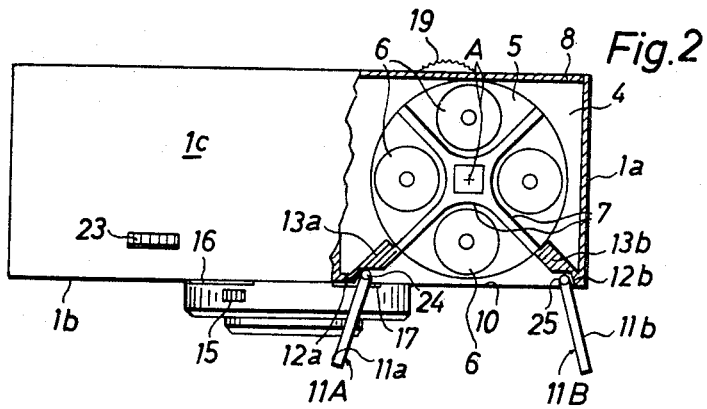
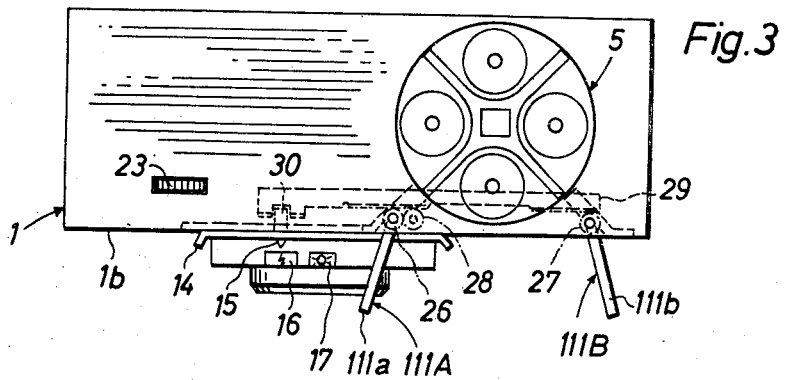
INVENTOR.
ARTUR FISCHER
BY
Michael S. Striker
Attorney

United States Patent Office 3,491,665
Patented Jan. 27, 1970

3,491,665
CAMERA WITH BUILT-IN FLASH UNIT
Artur Fischer, Gruenmettstetter Str. 133, Tumlingen, Kreis Freudenstadt, Germany
Filed Nov. 15, 1966, Ser. No. 594,433
Claims priority, application Germany, Nov. 17, 1965, F 29,109
Int. Cl. G03b 19/00
U.S. Cl. 95—11    10 Claims

ABSTRACT OF THE DISCLOSURE

The top and front walls of the housing in a still camera are provided with openings communicating with a chamber which accommodates an indexible socket for a multiple flashbulb holder which is insertable and withdrawable through the opening in the top wall. The front wall carries a pair of blinds having light-reflecting inner surfaces which normally close the respective opening and can be moved to open positions by a selector to thereby expose their reflecting surfaces, and stop members for locating the blinds in the open position. In the open position, the inner reflecting surfaces of the blinds direct a portion of the light emitted upon firing of a flashbulb toward the subject or scene being photographed. The top wall of the housing is provided with a cover member for closing the opening in the top wall after a flashbulb holder has been inserted therein to thereby prevent the escape of any light through the top opening.

---

The present invention relates to improvements in photographic cameras with built-in flash units, and more particularly to cameras whose flash units utilize "Flashcubes" or analogous multiple flash bulb holders.

It is already known to provide a still camera with a built-in flash unit which utilizes indexible multiple flashbulb holders. Such flash units normally comprise a socket which can be coupled with the customary plug of a flashbulb holder and is indexible by a separate wheel or lever, by the film transporting mechanism, or by the shutter release so as to place successive flashbulbs into an optimum position for firing during the next-following exposure with flash. The socket is normally mounted in the top wall of the camera housing so that the multiple flashbulb holder extends beyond the outlines of such housing and must be detached whenever the camera is to be stored in its case. Furthermore, the multiple flashbulb holder is likely to collect dust or other foreign matter if it remains attached to the socket when the camera is used to make exposures in daylight or in artificial light other than that produced by the built-in flash unit.

Accordingly, it is an important object of the present invention to provide a photographic camera whose built-in flash unit can utilize commercially available or specially constructed indexible multiple flashbulb holders of cubical, cylindrical or other outline and wherein the flash unit is constructed, assembled and installed in such a way that a flashbulb holder which is properly attached to the socket need not extend beyond the outlines of the camera housing so that the housing can be readily accommodated in a customary carrying case.

Another object of the invention is to provide a camera of the just outlined characteristics wherein the multiple flashbulb holder can be fully concealed when the camera is used to make exposures in daylight so that the holder cannot collect dust, moisture or other foreign matter.

A further object of the invention is to provide a camera wherein the flash unit automatically exposes an unfired flashbulb when the camera is set for operation with flash and wherein two or more flashbulbs can be fired seriatim without necessitating replacement of the holder.

An additional object of the invention is to provide a camera wherein certain parts of the flash unit perform several important functions, for example, of concealing or exposing a multiple flashbulb holder and of reflecting light against a subject when the camera is used to make exposures with flash.

Still another object of the invention is to provide a flash unit of the above outlined characteristics which can be built into a still camera or movie camera in such a way that it adds little, if anything, to the dimensions of the camera housing.

A concomitant object of the invention is to provide a flash unit which is built into the housing of a photographic camera and can take commercially available "Flashcubes" or analogous multiple flashbulb holders to support such holders entirely within the confines of the camera housing so that the latter may be stored in a simple and inexpensive carrying case.

A further object of my invention is to provide a flash unit which is built into the housing of a photographic camera and wherein a spent multiple flashbulb holder can be replaced by a fresh holder in a very simple and time-saving operation so that even an inexperienced amateur can manipulate the camera without damaging the sensitive parts of the flash unit.

Briefly stated, one feature of my present invention resides in the provision of a photographic camera which comprises a housing defining an internal chamber large enough to accommodate a commercially available multiple flashbulb holder and having a front wall provided with an opening or window which communicates with the chamber so that at least one flashbulb of a properly inserted holder can face the subject, and a flash unit including a socket or an analogous coupling member mounted in the housing and indexible about a predetermined axis. The socket is arranged to support a multiple flashbulb hollder which is introduced into and fully accommodated in the chamber so that successive flashbulbs of the holder are located directly behind the opening in the front wall to face the subject in response to indexing of the socket. The chamber is preferably adjacent to one side wall of the camera housing and the latter is preferably provided with a second opening, for example, in its top wall and opposite the socket, to facilitate insertion and withdrawal of multiple flashbulb holders from the chamber. However, the front opening can be dimensioned in such a way that a holder can be moved therethrough for attachment to or disconnected from the socket.

The opening in the top wall is normally sealed by a cover or lid which is hingedly secured to or is completely detachable from the camera housing. The opening in the front wall is normally sealed by a suitable closure, preferably by one comprising two blinds hingedly connected with the front wall of the housing and provided with reflecting internal surfaces which can direct light against the subject in response to firing of that flashbulb which has been indexed to a position directly behind the opening in the front wall.

The novel features which are considered as characteristic of the invention are set forth in particular in the appended claims. The improved camera itself, however, both as to its construction and its mode of operation, together with additional features and advantages thereof, will be best understood upon persual of the following detailed description of certain specific embodiments with reference to the accompanying drawings, in which:

FIG. 1 is a front elevational view of a still camera which embodies one form of my invention;

FIG. 2 is a top plan view of the camera, with a portion of the top wall of the housing broken away; and FIG. 3 is a top plan view of a modified camera, with the cover for the chamber removed.

Referring first to FIGS. 1 and 2, there is shown a still camera which comprises a substantially box-shaped housing 1 having a lower section 2 which supports a mount for the objective 20 and an upper section 3 which accommodates a light meter 21, a viewfinder 22, and the upper portion of a shutter release trigger 23. A portion of the internal space in the upper section 3 constitutes a chamber 4 which is dimensioned in such a way that it can accommodate a commercially available multiple flashbulb holder 5 here shown as a short cylinder having four equidistant flashbulbs 6 each loacted in front of a concave reflector 7. The chamber 4 is adjacent to one side wall 1a of the housing 1 and the latter's front wall 1b has a rectangular opening or window 10 which communicates with the chamber 4 so that one of the flashbulbs 6 can be moved to a position directly behind the window 10 to illuminate the subject during the next exposure with flash.

The built-in flash unit of the camera shown in FIGS. 1 and 2 comprises a female coupling member or socket 18 which is installed in the bottom region of the chamber 4 opposite a top wall 1c of the housing 1 and is indexible about a vertical axis A—A. The socket 18 is provided with a customary recess of cruciform or similar outline (not shown) which can receive the downwardly extending plug of the multiple flashbulb holder 5 so that, when properly coupled with the socket 18, the holder 5 is indexible therewith through angles of 90 degrees or a multiple of 90 degrees in order to place successive unfired flashbulbs 6 into an optimum position for firing. The flash unit further comprises a conventional flash circuit (not shown) which includes a battery, a capacitor and a synchronizing switch which is closed in response to actuation of the trigger 23 to discharge the capacitor and to thereby fire that flashbulb which is located immediately behind the window 10. It is clear that the chamber 4 can be dimensioned to accommodate a conventional "Flashcube" or another known multiple flashbulb holder.

The socket may be indexed by a wheel 19 a portion of which extends from the rear side of the housing 1, by the film transporting mechanism (not shown) or by the shutter release trigger 23.

The top wall 1c of the housing 1 is provided with a second rectangular opening or window 8 which is normally sealed by a one-piece cover or lid 9. In the illustrated embodiment, the cover 9 is bodily detachable from the top wall 1c and is provided with a suitable latch 9a or with an analogous locking mechanism which can hold it in sealing or closed position. When the cover 9 is moved to open position, it exposes the opening 8 so that the user can withdraw a spent holder 5 or insert a fresh holder. If desired, the cover 9 may be hingedly secured to the top wall 1c. The purpose of the cover 9 is to prevent entry of dust, moisture or other foreign matter into the chamber 4 and also to prevent uncontrolled detachment of a holder 5 from the socket 18.

The closure for the front opening or window 10 comprises two mirror symmetrical flaps or blinds 11a, 11b which are pivotably secured to the front wall 1b by hinges 24, 25 and are movable between closed positions (FIG. 1) and open positions (FIG. 2). In their open positions, the outer sides of the blinds 11a, 11b abut against fixed stops 12a, 12b of the front wall 1b and are thereby held in an optimum position to reflect light emitted by a bulb 6 toward the subject. For this purpose, the internal surfaces 11A, 11B are preferably provided with a mirror-like finish to reflect light in a desired direction when the blinds abut against the stops 12a, 12b. The chamber 4 preferably accommodates two additional or auxiliary reflectors 13a, 13b which extend between the vertical edges of a concave reflector 7 and the reflecting surfaces 11A, 11B to form therewith a continuous reflector for light emitted by a bulb 6 which is located directly behind the opening 10.

The blinds 11a, 11b are movable to open and closed positions by hand and may be provided with suitable latch means to hold them in open positions. It is also possible to install the blinds 11a, 11b with at least some friction so that they automatically remain in open or closed positions. When moved to closed positions, the blinds 11a, 11b conceal the chamber 4 and prevent entry of foreign matter. Also, the camera housing 1 can be readily stored in a conventional carrying case when the lid 9 and blinds 11a, 11b are moved to closed positions.

The auxiliary reflectors 13a, 13b are of particular advantage when the multiple flashbulb holder 5 is of cylindrical outline.

The front wall 1b of the housing 1 carries a ring-shaped selector 14 which is turnable back and forth about the optical axis of the objective 20 to respectively set the camera for operation with flash and for operation in daylight. When moved to a first position in which its index 15 registers with a graduation on a first fixed scale 17, the selector 14 has set the camera for operation in daylight. When moved to a second position in which the index 15 registers with a graduation on a second fixed scale 16, the selector 14 has set the camera for operation with flash. Such movement of the selector 14 to second position can automatically provide an optimum diaphragm aperture and an optimum exposure time, for example, $\frac{1}{30}$ of a second.

FIG. 3 illustrates a modified still camera wherein the blinds 11a, 11b of the closure for the front opening 10 are replaced by blinds 111a, 111b each carrying a pinion 27, 26. These pinions form part of a motion transmitting connection between the blinds 111a, 111b and the selector 14, and the purpose of this connection is to automatically move the blinds to open position when the selector 14 is moved to its second position in which the index 15 registers with the scale 16. The connection further comprises an intermediate pinion 28 which meshes with the pinion 26 and a reciprocable rack 29 which is mounted in the housing 1 and meshes with the pinions 27, 28. A pin 30 couples the rack 29 with the selector 14 so that the rack moves back and forth along a straight path in response to turning of the selector 14 between first and second positions. The pinion 28 insures that the pinions 26, 27 rotate in opposite directions and move the blinds 111a, 111b between open and closed positions. The light reflecting surfaces of the blinds are shown at 111A and 111B.

Otherwise, the construction of the camera shown in FIG. 3 is identical with that of the previously described camera and its parts are denoted by similar reference numerals. The blinds 11a, 11b or 111a, 111b could be replaced by a flexible curtain which could be moved in front of and away from the opening 10 in response to manual displacement or in response to movements of the selector 14. However, a closure utilizing two pivotable blinds is preferred at this time because such blinds can perform the additional function of reflecting light toward the subject when the opening 10 is exposed.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a photographic camera, a housing defining an internal chamber and having a front wall provided with an opening in communication with said chamber; a flash unit including a socket mounted in said housing and indexible about a predetermined axis, said socket being arranged to support a multiple flashbulb holder which is introduced into and fully accommodated in said chamber so that successive flashbulbs of the holder are located behind said opening to face the subject in response to repeated indexing of said socket; a closure having blinds mounted on said housing and movable between open positions and closed positions to respectively expose and close said opening, said blinds having light-reflecting inner surfaces which are exposed in the open positions of said blinds but are located inside said housing in closed positions of said blinds; and stop means provided on said housing to locate the blinds in said open positions thereof in such a way that a portion of light emitted on firing of a flashbulb which is located behind said opening is reflected onto the subject by said blinds.

2. A structure as defined in claim 1, wherein said housing is provided with a second opening located opposite said socket to permit insertion and withdrawal of a multiple flashbulb holder from said chamber in the axial direction of said socket.

3. A structure as defined in claim 2, further comprising cover means movable between closed and open positions to respectively close and expose said second opening.

4. A structure as defined in claim 1, wherein said housing further comprises a top wall provided with a second opening to permit insertion and withdrawal of a holder from said chamber, and further comprising cover means movable between closed and open positions to respectively close and expose said second opening.

5. A structure as defined in claim 1, wherein said closure comprises two mirror symmetrical blinds hingedly connected to said housing.

6. In a photographic camera, a housing defining an internal chamber and having a closed rear wall, a front wall provided with a first opening in communication with said chamber and a top wall provided with a second opening in communication with said chamber; a flash unit including a socket mounted in said housing and indexible about a predetermined axis, said socket being arranged to support a mutliple flashbulb holder which is introduced by way of said second opening and is fully accommodated in said chamber so that successive flashbulbs of the holder are located behind said first opening to face the subject in response to repeated indexing of said socket; and cover means for said second opening, said cover means being mounted on said housing and being movable between an open position permitting insertion of said multiple flashbulb holder and a closed position for closing said second opening after insertion of said multiple flashbulb holder so as to prevent escape of light through said second opening during firing of a flashbulb located in said internal chamber.

7. A structure as defined in claim 6, wherein said axis is vertical and said socket is mounted in the lowermost part of said chamber so that a flashbulb holder can be moved into engagement with and away from said socket in the direction of said axis upon movement of said cover means to open position.

8. In a photographic camera, a housing defining an internal chamber and having a front wall provided with an opening in communication with said chamber; a flash unit including a socket mounted in said housing and indexible about a predetermined axis, said socket being arranged to support a multiple flashbulb holder which is introduced into and fully accommodated in said chamber so that successive flashbulbs of the holder are located behind said opening to face the subject in response to repeated indexing of said socket; a closure movable between open and closed positions to respectively expose and seal said opening, said closure comprising a pair of blinds hingedly secured to said front wall for turning movement about parallel vertical axes, said blinds being movable in opposite directions to respectively place said closure in open and closed positions; selector means mounted on said housing and movable between first and second positions to respectively set the camera for operation in daylight and for operation with flash; and motion transmitting means for moving said closure to open position in response to movement of said selector means to second position, said motion transmitting means comprising a reciprocable toothed rack coupled with said selector means and pinion means operatively connected with said blinds and meshing with said rack.

9. A structure as set forth in claim 8, wherein said blinds have light reflecting surfaces which are exposed when said selector means is moved to second position so that such surfaces can reflect toward a subject light issuing from a flashbulb which is fired while being located immediately behind said opening.

10. A structure as set forth in claim 8, wherein said selector means comprises a ring which is turnable back and forth about the optical axis of the camera objective.

References Cited

UNITED STATES PATENTS

| 3,172,345 | 3/1965 | Jakob et al. | 95—11 |
| 3,296,947 | 1/1967 | Engelsmann et al. | 95—11.5 XR |
| 3,307,461 | 3/1967 | Cooper et al. | 240—1.3 XR |
| 3,353,463 | 11/1967 | Horton et al. | 240—1.3 XR |
| 3,374,719 | 3/1968 | Horton et al. | 95—11 |

FOREIGN PATENTS

| 38,439 | 1/1963 | Japan. |

NORTON ANSHER, Primary Examiner

FRED L. BRAUN, Assistant Examiner

U.S. Cl. X.R.

240—1.3, 37.1